United States Patent
Mori

(10) Patent No.: US 6,445,825 B2
(45) Date of Patent: *Sep. 3, 2002

(54) APPARATUS AND METHOD OF GENERATING COMPRESSED DATA

(75) Inventor: Kenji Mori, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/155,101

(22) PCT Filed: Jan. 22, 1998

(86) PCT No.: PCT/JP98/00241
§ 371 (c)(1),
(2), (4) Date: Sep. 21, 1998

(87) PCT Pub. No.: WO98/33281
PCT Pub. Date: Jul. 30, 1998

(30) Foreign Application Priority Data

Jan. 23, 1997 (JP) .............................. 9-10591

(51) Int. Cl.[7] .................................. G06K 9/36
(52) U.S. Cl. .................. 382/232; 348/419.1; 365/78; 711/5
(58) Field of Search .............................. 382/232, 234, 382/239, 244; 348/462, 467, 465, 419.1; 386/125; 711/5, 119; 365/78, 189.01

(56) References Cited

U.S. PATENT DOCUMENTS

| | | | | |
|---|---|---|---|---|
| 5,500,672 A | * | 3/1996 | Fujii | 348/14.13 |
| 5,802,311 A | * | 9/1998 | Wronski | 709/217 |
| 5,838,664 A | * | 11/1998 | Polomski | 370/263 |
| 5,864,546 A | * | 1/1999 | Campanella | 370/316 |
| 5,874,995 A | * | 2/1999 | Naimpally et al. | 375/240.25 |
| 5,898,695 A | * | 4/1999 | Fujii et al. | 370/464 |
| 5,982,459 A | * | 11/1999 | Fandrianto et al. | 348/425.3 |
| 6,018,765 A | * | 1/2000 | Durana et al. | 709/217 |

FOREIGN PATENT DOCUMENTS

| | | |
|---|---|---|
| JP | 62-93728 | 4/1987 |
| JP | 4-101538 | 4/1992 |
| JP | 6-6387 | 1/1994 |
| JP | 6-19629 | 1/1994 |
| JP | 8-18941 | 1/1996 |
| JP | 8-340393 | 12/1996 |

* cited by examiner

*Primary Examiner*—Bhavesh Mehta
*Assistant Examiner*—Ali Bayat
(74) *Attorney, Agent, or Firm*—Frommer Lawrence & Haug LLP; William S. Frommer; Dexter Chang

(57) ABSTRACT

Compression and encoding sections (311 (1), 311 (2) and 311 (3) compress and encode input signals VS, AS and SS separately to generate compressed data. A SCSI interface (32) outputs the compressed data to a DSM (50). Output buffers (312 (1), 312 (2) and 312 (3)), a stream interface (34) and an input buffer (33) transfer the compressed data generated at the compression and encoding sections (311 (1), 311 (2) and 311 (3)) to the SCSI interface (32) through data transfer buses (38(1), 38 (2), 38 (3), 39 and 40). A CPU (35), a RAM (36) and a ROM (37) control data transfer through a CPU bus (42).

20 Claims, 12 Drawing Sheets

APPARATUS AND METHOD OF GENERATING COMPRESSED DATA

TECHNICAL FIELD

The present invention relates to an apparatus and a method of generating compressed data that compresses and encodes imputted data and outputs the compressed data generated through the compression and encoding process to communication media.

BACKGROUND ART

Advances in digital techniques have allowed practical utilization of a multimedia system. The multimedia system is defined as a system for integrational handling of multiple representation media (video data, audio data, additional data and so on) with a single communication medium (a telecommunication medium, a storage medium, a broadcast medium and so on).

The multimedia system includes a digital video disk (DVD) authoring system and a digital satellite broadcasting system. The DVD authoring system is a system for recording multiple representation media such as video data (referred to as 'material data' in the following description) in a unified form on a single DVD (a storage medium). The digital satellite broadcasting system is a system for broadcasting program data of multiple channels (data made up of a plurality of material data) in a unified form through a single communications line (a broadcast medium).

In order to implement such a multimedia system, an apparatus for generating compressed data is required for compressing and encoding material data such as video data and outputting the compressed data generated through the compression and encoding process to a communication medium.

The apparatus for generating compressed data requires: a means for compressing and encoding material data to generate compressed data; a means for outputting the compressed data generated through the compression and encoding process to a communication medium; and a means for transferring the compressed data to the means for outputting.

FIG. 12 is a block diagram showing a related-art apparatus for generating compressed data comprising the three means described above. FIG. 12 illustrates an output of compressed data obtained through a compression and encoding process to a communication medium wherein the compressed data is outputted to the communication medium as it is.

The compressed data generating apparatus 10 comprises: a video encoder 11 (1); an audio encoder 11 (2); a subtitle encoder 11 (3); a small computer system interface (SCSI) 12; a central processing unit (CPU) 13; a random access memory (RAM) 14; a read only memory (ROM) 15; and a CPU bus 16.

The encoders 11 (1) to 11 (3) have compression and encoding sections 111 (1) to 111 (3) and output buffers 112 (1) to 112 (3). The compression and encoding sections 111 (1) to 111 (3) constitute the means for compressing and encoding described above. The SCSI interface 12 constitutes the means for outputting described above. The means for transferring described above is made up of the output buffers 112 (1) to 112 (3), the CPU 13, the ROM 14, the RAM 15 and the CPU bus 16.

In the apparatus 10, video signal VS, audio signal AS and subtitle signal SS of one program are each individually compressed and encoded at the corresponding compression and encoding sections 111 (1) to 111 (3) of the encoders 11 (1) to 11 (3) to be written into the output buffers 112 (1) to 112 (3), respectively.

The compressed data written into the output buffers 112 (1) to 112 (3) is transferred to the RAM 14 by the CPU 13 through the CPU bus 16. The compressed data transferred to the RAM 14 is transferred to the SCSI interface 12 by the CPU 13 through the CPU bus 16. Streams of data transferred to the SCSI interface 12 are supplied to a digital storage medium (DSM) 20 according to the SCSI protocol.

The CPU 13 controls reading of the compressed data from the output buffers 112 (1) to 112 (3) based on remaining space in the output buffers 112 (1) to 112 (3). The remaining space in the output buffers 112 (1) to 112 (3) is determined based on data size information indicating a size of the compressed data. The data size information is generated at the compression and encoding sections 111 (1) to 111 (3) to be sent to the RAM 16 by the CPU 15 through the CPU bus 18.

As described so far, the related-art apparatus 10 for generating compressed data allows the CPU 13 to perform both of the process for compressed data transfer and the process for controlling the data transfer process. In other words, the related-art apparatus 10 transfers both compressed data and control data such as data size information through the CPU bus 16.

In the configuration, however, compressed data and control data concentrate on the CPU bus 16. A traffic on the CPU bus 16 thus increases. Consequently, limitations are imposed on transfer of compressed data and control data.

It is therefore impossible for the related-art apparatus 10 to provide real-time generation of compressed data. It is also required that capacities of the output buffers 112 (1) to 112 (3) be enlarged.

Another problem is that the apparatus 10 not capable of providing real-time generation of compressed data is not applicable to the multimedia system requiring real-time processing.

DISCLOSURE OF THE INVENTION

It is an object of the invention to provide an apparatus for generating compressed data and a method of generating compressed data wherein limitations are reduced on transfer of compressed data and control data due to an increase in traffic.

An apparatus for generating compressed data of the invention comprises: a compression and encoding means for compressing and encoding input data and outputting the data; an output means for outputting the compressed data outputted from the compression and encoding means; a data transfer means for transferring the compressed data outputted from the compression and encoding means to the output means; and a control means connected to the compression and encoding means through a control bus for performing control for inputting the compressed data outputted from the compression and encoding means to the data transfer means based on control information from the control bus.

In the apparatus, the input data is compressed and encoded by the compression and encoding means and outputted. The compressed data outputted from the compression and encoding means is controlled by the control means to be inputted to the data transfer means based on the control information from the control bus. The compressed data inputted to the data transfer means is transferred to the means for outputting. The compressed data transferred to the means for outputting is supplied to a communication medium by the means for outputting.

The data transfer process of the compressed data performed by the data transfer means is controlled by the control means through the control bus different from the data transfer bus. As a result, limitations are reduced on transfer of compressed data and control data due to an increase in traffic.

A method of generating compressed data of the invention includes: a step of compressing and encoding input data by a compression and encoding means; a transfer control step of receiving control information on the compressed data compressed and encoded in the step of compressing and encoding through a control bus and controlling transfer of the compressed data based on the received control information; a data transfer step of transferring the compressed data compressed and encoded in the step of compressing and encoding based on the transfer control step; and a step of outputting the compressed data transferred in the data transfer step to outside.

In the method, the input data is compressed and encoded in the step of compressing and encoding. The control information for the compressed data is received through the control bus in the transfer control step. Based on the control information, the transfer of the compressed data is controlled in the transfer control step. Based on the transfer control step, the compressed data is transferred in the data transfer step. The compressed data transferred in the data transfer step is outputted to outside in the step of outputting.

The data transfer process is controlled through the bus different from the data transfer bus. As a result, limitations are reduced on transfer of compressed data and control data due to an increase in traffic.

BRIEF DESCRIPTION OF THE DRAWINGS

Other and further objects, features and advantages of the invention will appear more fully from the following description with reference to accompanying drawings.

BEST MODE FOR CARRYING OUT THE INVENTION

Preferred embodiments of the present invention will now be described in detail with reference to the accompanying drawings.

A first embodiment of the invention will now be described in detail. The first embodiment allows compressed data generated through a compression and encoding process of a means for compression and encoding to be transferred to a means for data output through a data transfer line. The transfer process is controlled through a transfer control line other than the data transfer line.

Figure 1:
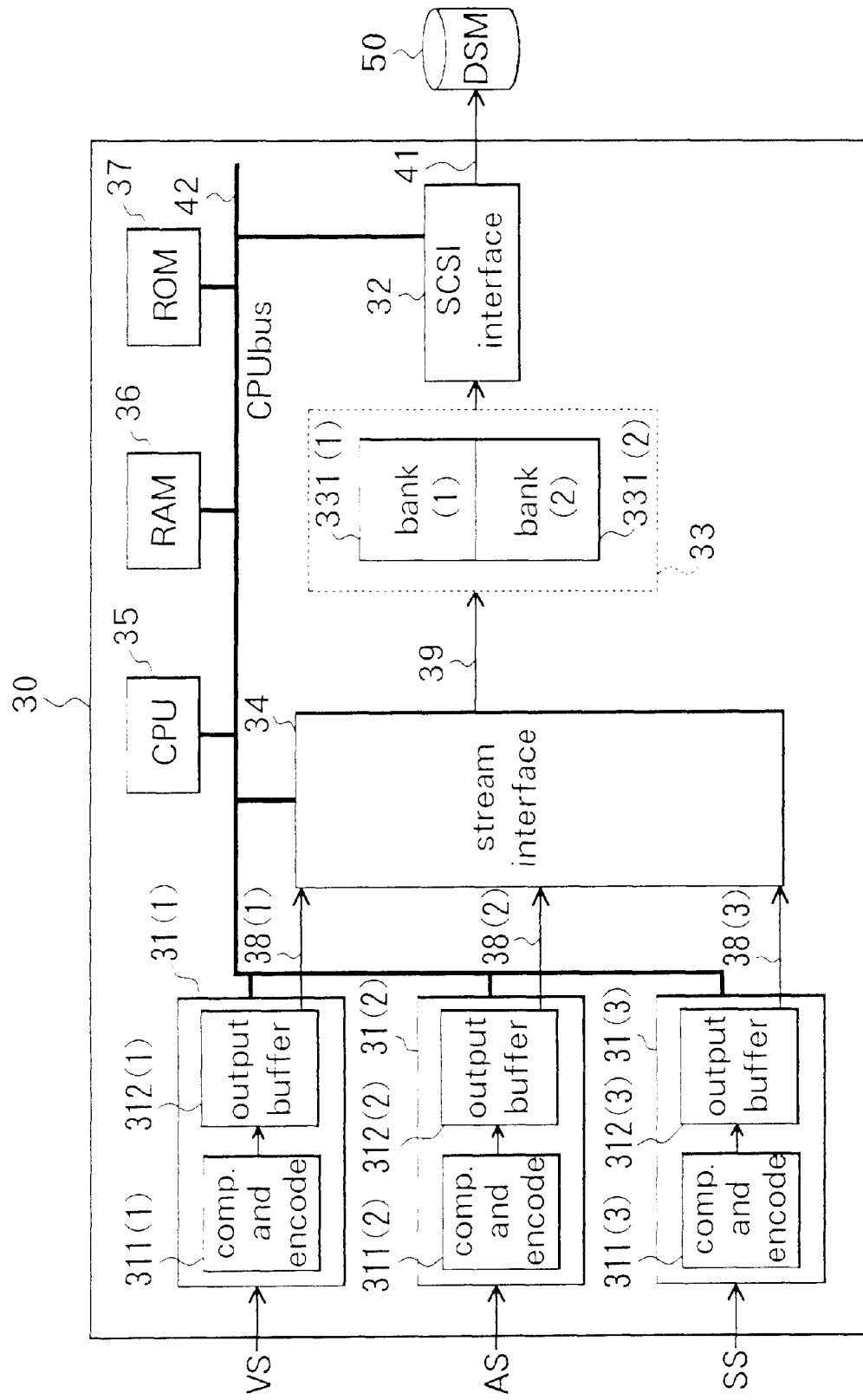
FIG. 1 is a block diagram of an apparatus for generating compressed data of a first embodiment of the invention.

FIG. 1 is a block diagram showing a configuration of the first embodiment. FIG. 1 illustrates an output of compressed data generated through a compression and encoding process to a storage medium wherein the compressed data is outputted to the storage medium as it is.

A compressed data generating apparatus 30 shown in FIG. 1 separately compresses and encodes temporally relating three types of material signals to be outputted to a DSM 50. FIG. 1 shows video signals VS, audio signals AS and subtitle signals SS of one program as examples of the temporally relating three types of material signals.

The compressed data generating apparatus 30 comprises: a video encoder 31 (1) for compressing and encoding video signals VS and generating compressed video data; an audio encoder 31 (2) for compressing and encoding audio signals AS and generating compressed audio data; and a subtitle encoder 31 (3) for compressing and encoding subtitle signals SS and generating compressed subtitle data.

The encoder 31 (n), where n=1, 2 or 3, has a compression and encoding section 311 (n) for compressing and encoding input signals and generating compressed data and an output buffer 312 (n) provided in an output stage of the section 311 (n) for provisionally storing the compressed data generated by the compression and encoding section 311 (n).

The output buffers 312 (1) to 312 (3) are provided for preventing a collision of compressed data generated by the three compression and encoding sections 311 (1) to 311 (3). It is also noted that the output buffers 312 (1) to 312 (3) are required for a variable-length encoding scheme described below for compression and encoding of video signals VS and so on. The output buffers 312 (1) to 312 (3) are made up offirst-in, first-out (FIFO) memory, for example.

The compressed data generating apparatus 30 in FIG. 1 further comprises a SCSI interface 32 for outputting compressed data generated through a compression and encoding process to the DSM 50. The SCSI interface 32 is made up of a controller of direct memory access (DMA) and a SCSI protocol controller.

The compressed data generating apparatus 30 further comprises an input buffer 33 for provisionally storing compressed data to be inputted to the SCSI interface 32. The input buffer 33 is located in an input stage of the SCSI interface 32. The input buffer 33 is provided for absorbing difference in operating speed between the input and output of the SCSI interface 32.

The input buffer 33 has two banks 331 (1) and 331 (2) each independently accessible. The banks 331 (1) and 331 (2) are controlled so that the one is used for writing while the other is used for reading and vice versa.

The compressed data generating apparatus 30 further comprises a stream interface 34 for transferring compressed data stored in the output buffers 312 (1) to 312 (3) to the input buffer 33.

The compressed data generating apparatus 30 further comprises: a CPU 35 for controlling a process of transferring compressed data generated by the compression and encoding sections 311 (1) to 311 (3) to the SCSI interface 32; a RAM 36 to be used as work memory for the CPU 35; and a ROM 37 for retaining a process program of the CPU 35.

The compressed data generating apparatus 30 further comprises: data transfer buses 38 (1) to 38 (3) for transferring compressed data from the output buffers 312 (1) to 312 (3) to the stream interface 34; a data transfer bus 39 for transferring streams of data from the stream interface 34 to the input buffer 33; a data transfer bus 40 for transferring streams of data from the input buffer 33 to the SCSI interface 32; and a data transfer bus 41 for transferring streams of data from the SCSI interface 32 to the DSM 50.

The compressed data generating apparatus 30 further comprises a CPU bus 42 for connecting the CPU 35 to the encoders 31 (1) to 31 (3), the stream interface 34, the SCSI interface 32, the RAM 36, and the ROM 37.

In the configuration described so far, the compression and encoding sections 311 (1) to 311 (3) of the encoders 31 (1) to 31 (3) form the means for compression and encoding of the apparatus for generating compressed data of the invention, that is, the compression and encoding means that compresses and encodes inputted data and outputs the compressed data. The SCSI controller 32 constitutes the data output means of the invention for outputting compressed data outputted from the means for compression and encoding to a communication medium.

The data transfer means of the invention is made up of: the output buffers 312 (1) to 312 (3); the stream interface 34; the input buffer 33; and the data transfer buses 38 (1) to 38 (3), 39 and 40. The data transfer means is provided for transferring compressed data outputted from the means for compression and encoding to the data output means. The stream interface 34 corresponds to a data interface of the invention.

The control means of the invention is made up of the CPU 35, the RAM 36, and the ROM 37. The control means is connected to the means for compression and encoding and provided for controlling compressed data outputted from the means for compression and encoding to be inputted to the data transfer means based on control information from a control bus. The control bus corresponds to the CPU bus 42. The output buffers 312 (1) to 312 (3) corresponds to a first accumulation means of the invention. The input buffer 33 corresponds to a second accumulation means of the invention. The bank 331 (1) of the input buffer 33 corresponds to a first storage means of the invention and the bank 331 (2) to a second storage means of the invention.

The configuration of the apparatus of the first embodiment of the invention is described so far. The embodiment uses MPEG2 of the moving picture experts group, for example, for compression and encoding of material data. Compressed data generated through a compression and encoding process of MPEG2 is usually called elementary stream data (ES data). Compressed data is referred to as ES data in the following description.

An operation of the apparatus with the configuration as above will now be described.

Video signals VS inputted from an outside source to the video encoder 31 (1) are compressed and encoded per specific unit of compression and encoding by the compression and encoding section 311 (1). The specific unit of compression and encoding in the embodiment is one frame. Alternatively, the unit may consist of more than one frame.

ES video data is thus generated. The ES data is written into the output buffer 312 (1) by the compression and encoding section 311 (1).

Similarly, audio signals AS inputted from an outside source to the audio encoder 31 (2) are compressed and encoded per specific unit of compression and encoding by the compression and encoding section 311 (2) to be written into the output buffer 312 (2). The specific unit of compression and encoding in the section 311 (2) in the embodiment is one audio frame. Alternatively, any other unit may be used. Subtitle signals SS inputted from an outside source to the subtitle encoder 31 (3) is compressed and encoded per specific unit of compression and encoding by the compression and encoding section 311 (3) to be written into the output buffer 312 (3).

The ES data written into the output buffer 312 (n), where n=1, 2 or 3, is transferred to the input buffer 33 by the stream interface 34. The ES data transferred to the input buffer 33 is then transferred to the DSM 50 by the SCSI interface 32.

In this case, the data transfer process from the output buffer 312 (n) to the input buffer 33 and the data transfer process from the input buffer 33 to the DSM 50 are performed in a parallel manner.

That is, ES data stored in the output buffer 312 (n) is transferred to the bank 331 (1), for example, of the input buffer 33. If the bank 331 (1) becomes full, ES data stored in the output buffer 312 (n) is then transferred to the bank.331 (2) through the stream interface 34. ES data stored in the bank 331 (1) is transferred to the DSM 50 through the SCSI interface 32.

If the bank 331 (2) subsequently becomes full, ES data stored in the output buffer 312 (n) is in turn transferred to the bank 331 (1) through the stream interface 34. ES data stored in the bank 331 (2) is transferred to the DSM 50 through the SCSI interface 32.

Similarly, every time the bank 331 (m), where m=1 or 2, used for writing becomes full, the usage pattern of the two banks 331 (1) and 331 (2) changes. As a result, the data transfer from the output buffer 312 (n) to the input buffer 33 and the data transfer from the input buffer 33 to the DSM 50 are performed in a parallel manner through a pipeline process. The data transfer is therefore performed efficiently from the output buffers 312 (1) to 312 (3) to the DSM 50.

The CPU 35 controls the data transfer from the compression and encoding sections 311 (1) to 311 (3) to the SCSI interface 32. The control by the CPU 35 is largely categorized into control of the data transfer from the output buffer 312 (n) to the input buffer 33 and control of the data transfer from the input buffer 33 to the SCSI interface 32. The former data transfer control is based on a state of ES data storage in the output buffer 312 (n). The latter transfer control is based on a state of ES data storage in the input buffer 33.

Figure 2:
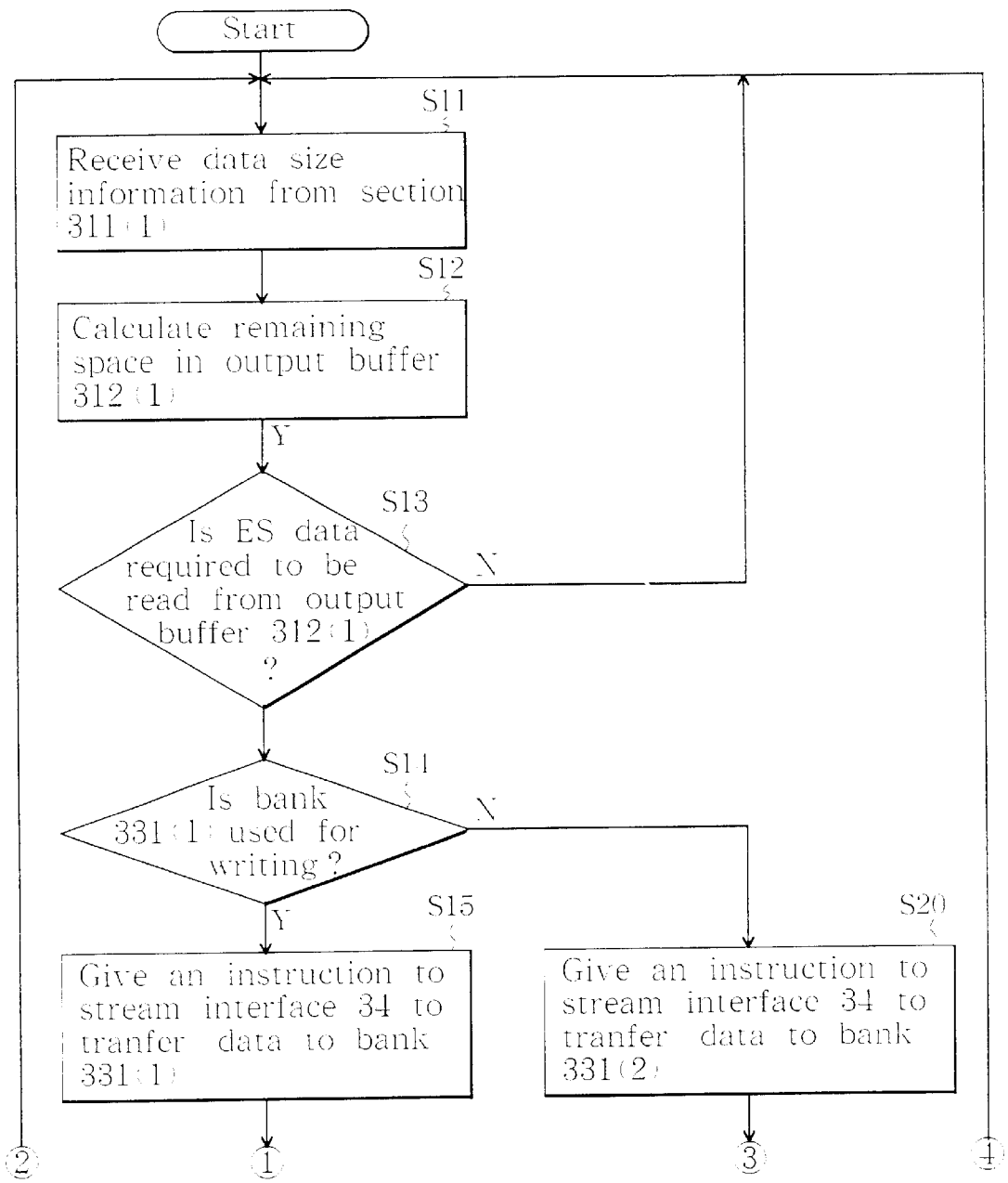
FIG. 2 is a flowchart showing a process of a CPU of the first embodiment.
Figure 3:
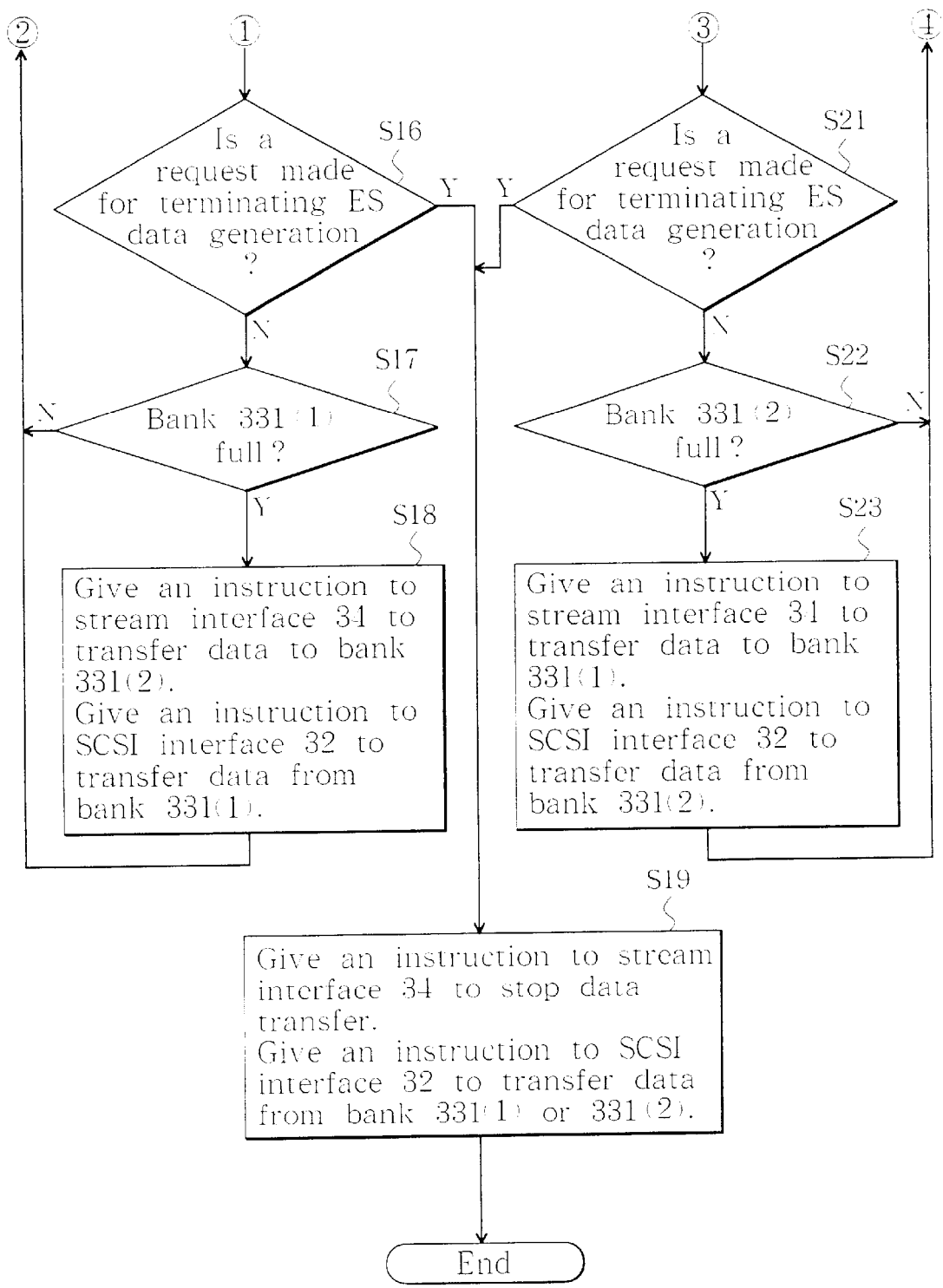
FIG. 3 is a flowchart showing the process of the CPU of the first embodiment.

FIG. 2 and FIG. 3 are flowcharts showing a process of the CPU 35. The following description with reference to FIG. 2 and FIG. 3 is given for control performed for ES data transfer from the compression and encoding sections 311 (1) to 311 (3) to the SCSI interface 32. For brevity, control for ES data transfer from the compression and encoding section 311 (1) of a video to the SCSI interface 32 will be only described.

The process shown is started at an occurrence of a request for ES video data generation. The request for ES video data generation is made by, for example, an operator performing an operation for ES video data generation.

In the process, the CPU 35 first performs a process for receiving data size information, that is, one of control information outputted from the compression and encoding section 311 (1) of the video (step S11 in FIG. 2). The data size information indicates a size of ES data of a unit of encoding. The data size information is outputted from the compression and encoding section 311 (1) every time a compression and encoding process completes for a unit of encoding.

Every time a compression and encoding process completes for a unit of encoding, the compression and encoding section 311 (1) outputs an interrupt signal indicating the completion of the compression and encoding process as well as outputs data size information. When the interrupt signal is generated, the CPU 35 executes a process for receiving data size information. The receiving process is performed through writing data size information outputted from the compression and encoding section 311 (n) into the RAM 36 via the CPU bus 42.

Next, the CPU 35 calculates remaining space (the amount of storage available) in the output buffer 312 (1) of the video based on the received data size information (step S12 in FIG. 2). That is, the CPU 35 determines the size of data buffered from the section 311 (1) to the output buffer 312 (1), based on the data size informatiom outputted from the section 311 (1). The remaining space in the output buffer 312 (1) is determined by calculating the capacity of the output buffer 312 (1) and the size of data buffered into the output buffer 312 (1). Information on the capacity of the output buffer 312 (1) may be stored in the ROM 37 in advance. The remaining space is calculated by comparing the information on the capacity and the data size information outputted from the section 311 (1) at the CPU 35. Furthermore, after the previous compression and encoding process is completed, the present remaining space of the output buffer 312 (1) is calculated in a similar manner, based on the remaining space of the output buffer 312 (1) calculated as described above and the data size information outputted after the present compression and encoding process is completed. The CPU 35 then determines whether reading ES data from the output buffer 312 (1) is required or not based on the calculated remaining space (step S13 in FIG. 2).

The determination is carried out through a comparison between the calculated remaining space and a predetermined threshold value. If the calculated remaining space is below the threshold value, reading is required. If the calculated remaining space is greater than or equal to the threshold value, reading is not required.

The CPU 35 returns to step S11 when reading of ES data is not required. The process described above is thus repeated. In a similar manner, the process is repeated until the CPU 35 determines that reading of ES data is required.

When the CPU 35 determines that reading of ES data from the output buffer 312 (1) is required, the CPU 35 determines whether the bank used for writing is the bank 331 (1) or not (step S14 in FIG. 2). If the bank 331 (1) is used, the CPU 35 provides an instruction to the stream interface 34 of data transfer to the bank 331 (1) (step S15 in FIG. 2).

Receiving the instruction, the stream interface 34 reads a predetermined amount of ES data from the output buffer 312 (1) through the data transfer bus 38 (1) and writes the data into the bank 331 (1) through the data transfer bus 39.

On completion of the instruction of step S15, the CPU 35 determines whether a request for terminating the ES data generation process is made or not (step S16 in FIG. 3). The request is made, for example, by an operator performing an operation for terminating the ES video data generation process.

If a request for termination is not made, the CPU 35 determines whether the bank 331 (1) is full or not (step S17). If the bank 331 (1) is not full, the CPU 35 returns to step S11. The process described above is thus repeated. In a similar manner, the process is repeated until the bank 331 (1) becomes full.

When the bank 331 (1) becomes full, the CPU 35 provides an instruction to the stream interface 34 to transfer data to the bank 331 (2) as well as an instruction to the SCSI interface 32 to transfer data from the bank 331 (1) (step S18 in FIG. 3).

On receiving the instruction, the stream interface 34 writes ES data read from the output buffer 312 (1) into the bank 331 (2) through the data transfer bus 39. As described above, a loss of ES data outputted from the output buffer 312 (1) and buffered into the input buffer 33 is prevented by switching the the banks 331 (1) to 331 (2).

On receiving the instruction from the CPU 35, the SCSI interface 32 reads the ES data written into the bank 331 (1) through the data transfer bus 40 and writes the data into the DSM 50 through the data transfer bus 41.

On completion of the instruction of step S18, the CPU 35 returns to step S11. The process described above is thus repeated.

If a request for terminating the ES data generating process is made in this stage, the CPU 35 gives an instruction to the stream interface 34 to stop the data transfer. On termination of transfer of ES data stored in the bank 331 (1), the CPU 35 gives an instruction to the SCSI interface 32 to transfer ES data stored in the bank 331 (2) (step S19 in FIG. 3).

On receiving the instruction, the stream interface 34 terminates the data transfer process. On receiving the instruction, the SCSI interface 32 reads ES data stored in the bank 331 (2) through the data transfer bus 40 and writes the data into the DSM 50 through the data transfer bus 41. The process of the CPU 35 is thus completed.

If it is determined that the bank used for writing is not the bank 331 (1) in step S14, the CPU 35 gives an instruction to the stream interface 34 to transfer data to the bank 331 (2) (step S20 in FIG. 2). On receiving the instruction, the stream interface 34 reads a predetermined amount of ES data from the output buffer 312 (1) and writes the data into the bank 331 (2).

On completion of the instruction of step S20, the CPU 35 determines whether a request for terminating the ES data generation process is made or not (step S21 in FIG. 3). If a request for termination is not made, the CPU 35 determines whether the bank 331 (2) is full or not (step S22 in FIG. 3). If the bank 331 (2) is not full, the CPU 35 returns to step S11. The process described above is thus repeated.

If the bank 331 (2) becomes full in this stage, the CPU 35 gives an instruction to the stream interface 34 to transfer ES data to the bank 331 (1). The CPU 35 gives an instruction to the SCSI interface 32 to transfer ES data from the bank 331 (2) (step S23 in FIG. 3).

On receiving the instruction, the stream interface 34 writes ES data read from the output buffer 312 (1) into the bank 331 (1) through the data transfer bus 39. On receiving the instruction, the SCSI interface 32 reads ES data from the bank 331 (2) through the data transfer bus 40.

On completion of the instruction of step S23, the CPU 35 returns to step S11. The process described above is thus repeated.

If a request for terminating the ES data generating process is made in this stage, the CPU 35 gives an instruction to the stream interface 34 to stop the data transfer. On termination of transfer of ES data from the bank 331 (2), the CPU 35 gives an instruction to the SCSI interface 32 for data transfer from the bank 331 (1) (step S19 in FIG. 3).

On receiving the instruction, the stream interface 34 terminates the data transfer. On receiving the instruction, the SCSI interface 32 transfers ES data stroed in the bank 331 (1) to the DSM 50. The process of the CPU 35 is thus completed.

The process of the CPU 35 is described so far. Similar control is given for ES data transfer from the compression and encoding section 311 (2) of an audio and the compression and encoding section 311 (3) of a subtitle to the SCSI interface 32. Detailed description thereof is omitted.

Figure 4:
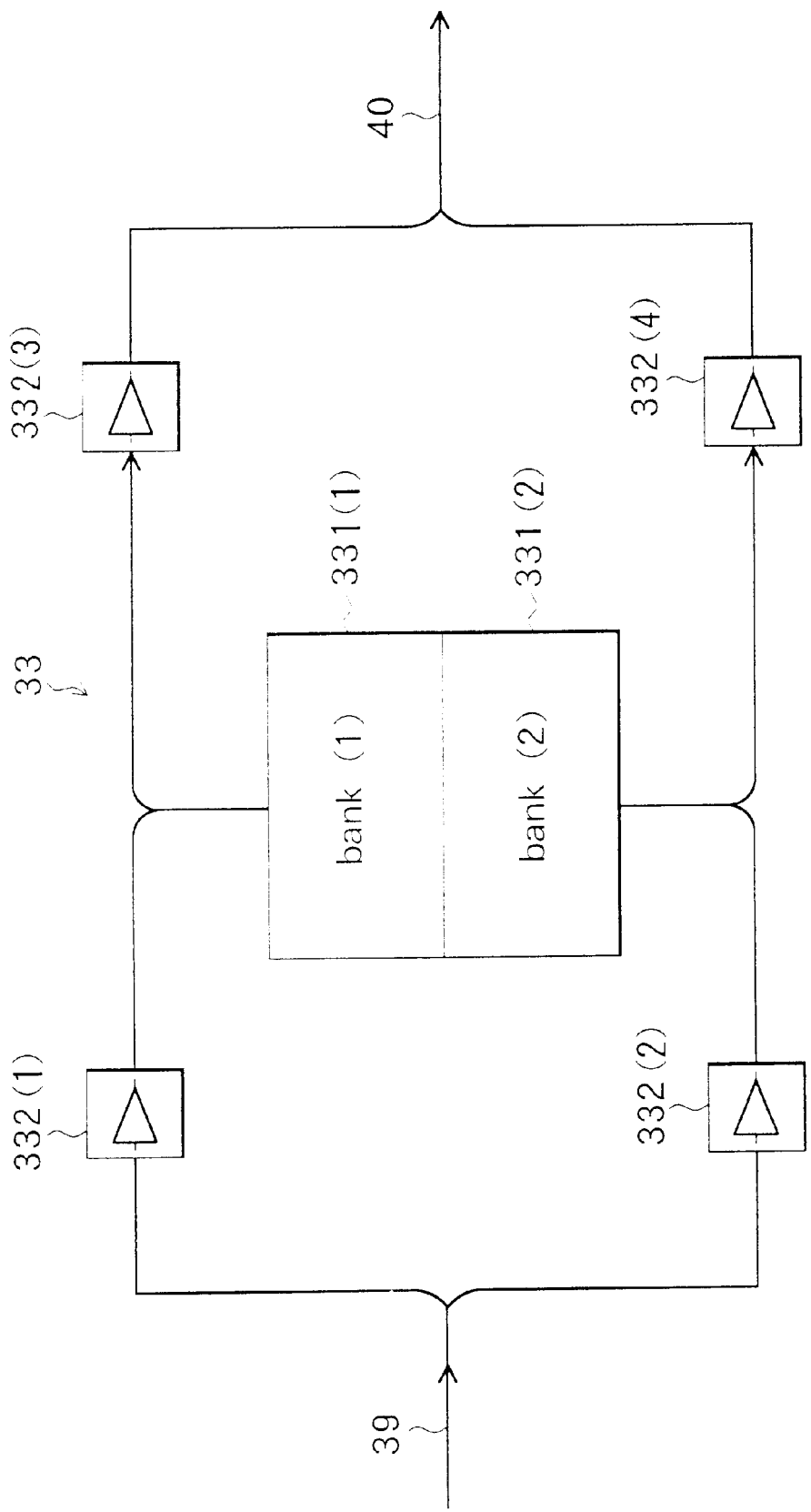
FIG. 4 is a block diagram of an input buffer of the first embodiment.

FIG. 4 is a block diagram showing a specific configuration of the input buffer 33. The input buffer 33 comprises the two banks 331 (1) and 331 (2) and four buffers 332 (1) to 332 (4).

The buffer 332 (1) is inserted between input/output terminals of the bank 331 (1) and the data transfer bus 39. The buffer 332 (2) is inserted between input/output terminals of the bank 331 (2) and the data transfer bus 39. The buffer 332 (3) is inserted between input/output terminals of the bank 331 (2) and the data transfer bus 40. The buffer 332 (4) is inserted between input/output terminals of the bank 331 (2) and the data transfer bus 40.

Turning on and off of the buffers 332 (1) and 332 (2) is controlled by the stream interface 34 based on instructions given by the CPU 35. Turning on and off of the buffers 332 (3) and 332 (4) is controlled by the SCSI interface 32 based on instructions given by the CPU 35.

Figure 5:
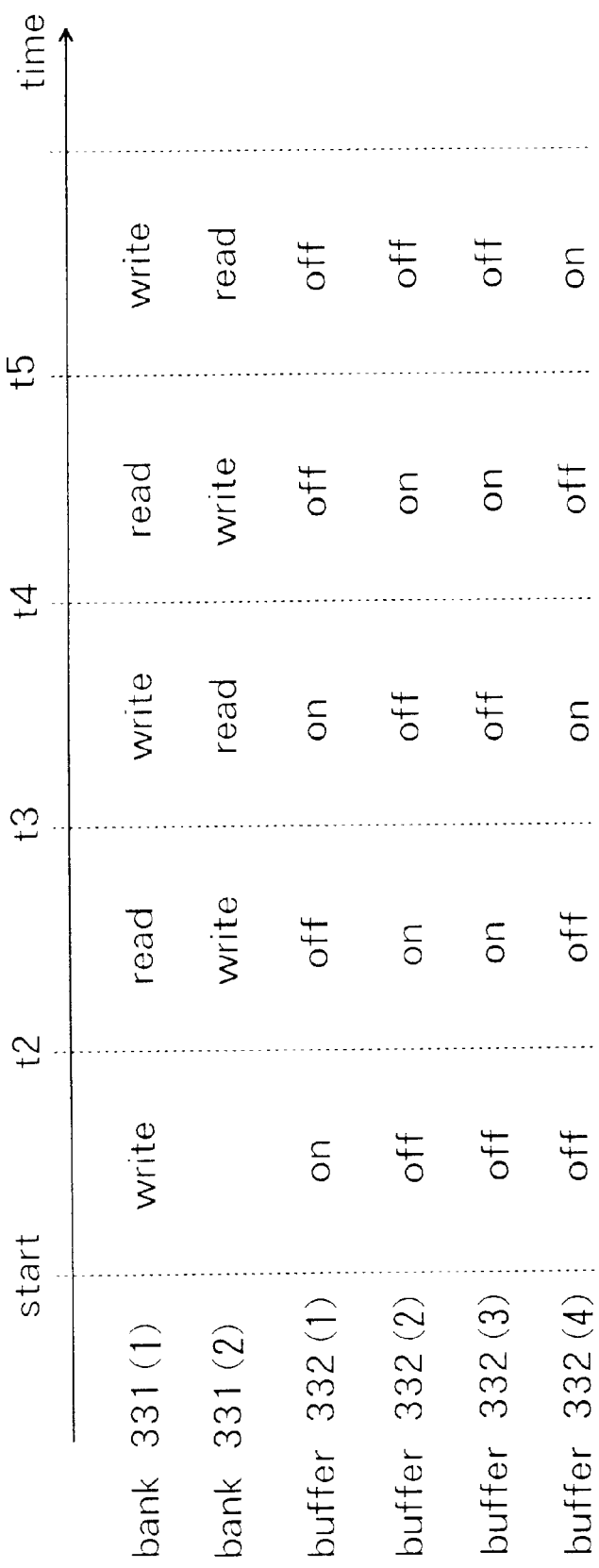
FIG. 5 is a chart for describing a pipeline process of the first embodiment.

FIG. 5 illustrates a pipeline process using the input buffer 33 with the two banks as described above. An operation of the input buffer 33 will now be described with reference to FIG. 5.

At a start of an ES data generating process (time t1), the buffer 332 (1) is set to on while the buffers 332 (2) to 332 (4) are off. Therefore the bank 331 (1) is connected to the data transfer bus 39 through the buffer 332 (1). Consequently, ES data read from the output buffer 312 (1) through the stream interface 34 is written into the bank 331 (1) through the buffer 332 (1).

Subsequently, when the bank 331 (1) becomes full (time t2), the buffers 332 (2) and 332 (3) are turned on while the buffers 332 (1) and 332 (4) are turned off. Therefore the bank 331 (2) is in turn connected to the data transfer bus 39 through the buffer 332 (2). The bank 331 (1) is connected to the data transfer bus 40 through the buffer 332 (3). Consequently, ES data read from the output buffer 312 (1) through the stream interface 34 is written into the bank 331 (2) through the buffer 332 (2). ES data stored in the bank 331 (1) is read through the SCSI interface 32 via the buffer 332 (3).

Subsequently, when the bank 331 (2) becomes full (time t3), the buffers 332 (1) and 332 (4) are turned on while the buffers 332 (2) and 332 (3) are turned off. Therefore the bank 331 (1) is in turn connected to the data transfer bus 39 through the buffer 332 (1). The bank 331 (2) is then connected to the data transfer bus 40 through the buffer 332 (4). Consequently, ES data read through the stream interface 34 is written into the bank 331 (1) through the buffer 332 (2). ES data stored in the bank 331 (1) is read through the SCSI interface 32 via the buffer 332 (4).

Subsequently, when the bank 331 (1) becomes full (time t4), the buffers 332 (2) and 332 (3) are turned on while the buffers 332 (1) and 332 (4) are turned off. As a result, ES data is in turn written into the bank 331 (2) while ES data is read from the bank 331 (1).

When a request for terminating the stream generating process is made and the bank 331 (2) becomes full (time t5), the buffer 332 (4) is turned on while the buffers 332 (1) to 332 (3) are turned off. As a result, ES data is in turn read from the bank 331 (2).

Figure 6:
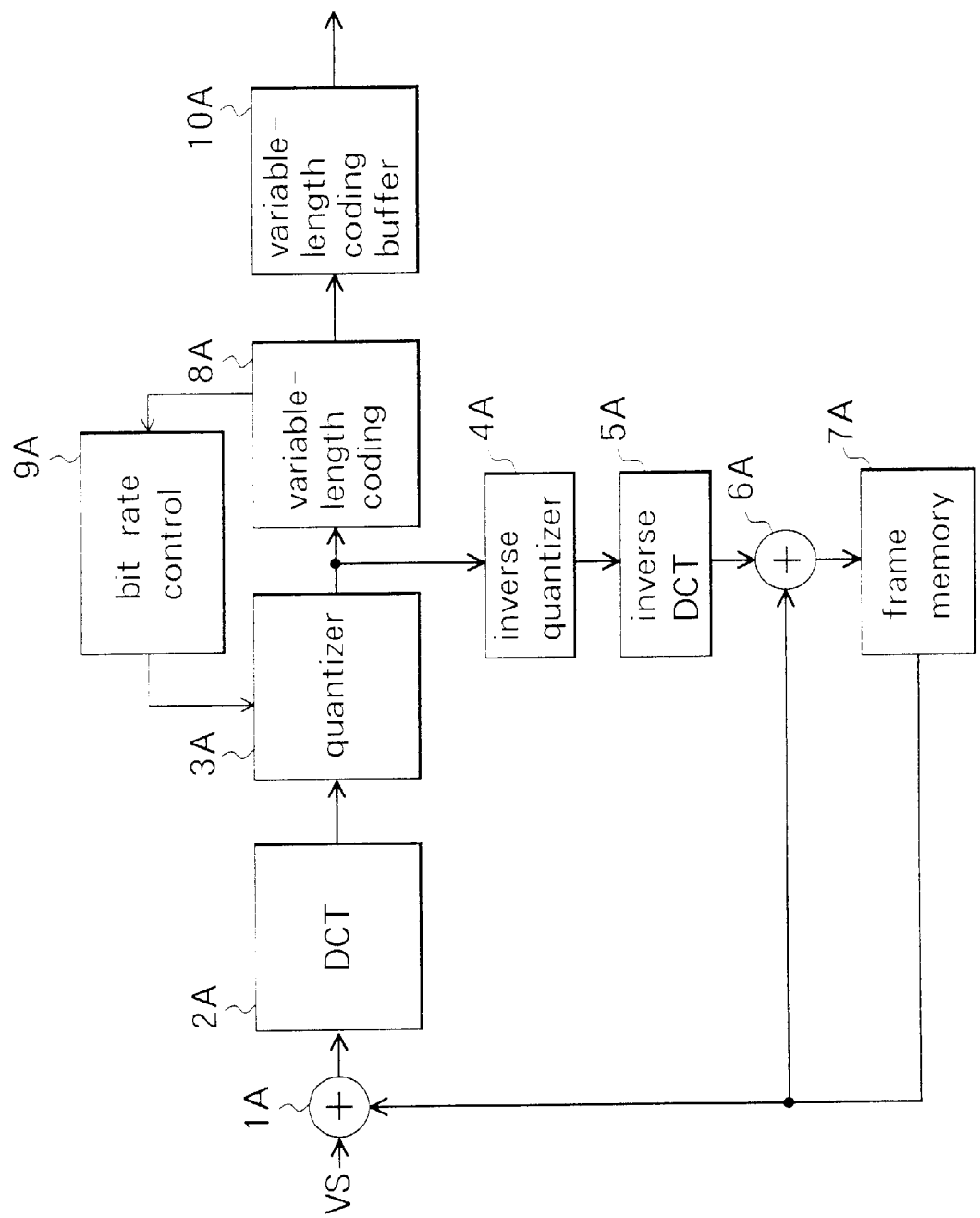
FIG. 6 is a block diagram of a practical example of a compression and encoding section of a video encoder of the first embodiment.

FIG. 6 is a block diagram showing a configuration of the compression and encoding section 311 (1) of the video encoder 31 (1).

The compression and encoding section 311 (1) shown comprises: a difference circuit 1A; a DCT circuit 2A; a quantizer circuit 3A; an inverse quantizer circuit 4A; an inverse DCT circuit 5A; an adding circuit 6A; a frame memory 7A; a variable-length coding circuit 8A; a bit rate control circuit 9A; and a variable-length coding buffer 10A.

In the configuration described above, a compression and encoding process is performed on video signal VS based on an intraframe correlation through the difference circuit 1A, the DCT circuit 2A, the quantizer circuit 3A and the bit rate control circuit 9A. Furthermore, a compression and encoding process is performed on video signal VS based on an interframe correlation through the inverse quantizer circuit 4A, the inverse DCT circuit 5A and the adding circuit 6A. Furthermore, a compression and encoding process is performed on video signal VS through the variable-length coding buffer 10A based on a bias in frequencies of occurrence of codes.

Figure 7:
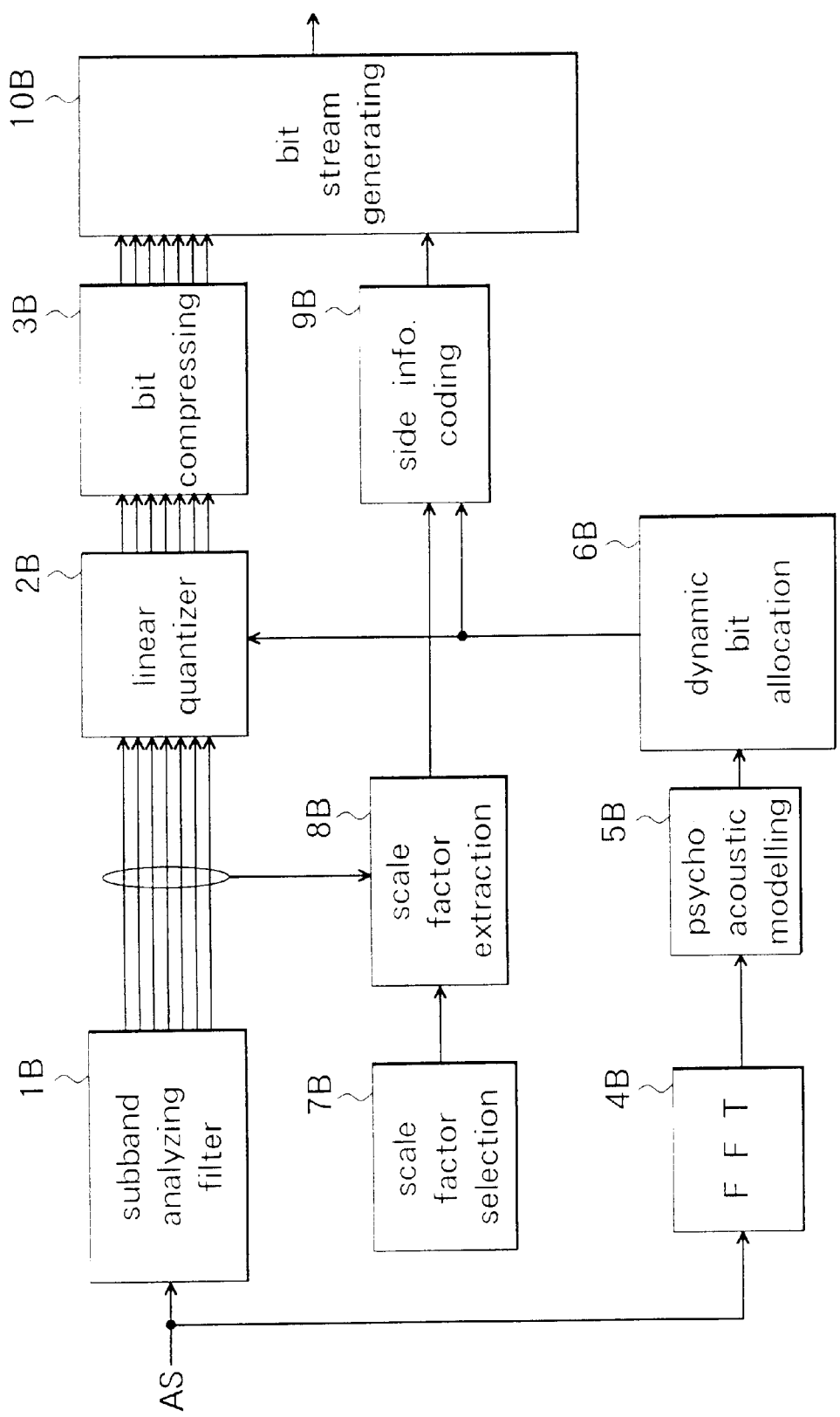
FIG. 7 is a block diagram of a practical example of a compression and encoding section of an audio encoder of the first embodiment.

FIG. 7 is a block diagram showing a configuration of the compression and encoding section 311 (2) of the audio encoder 31 (2).

The compression and encoding section 311 (2) shown comprises: a subband analyzing filter 1B; a linear quantizer circuit 2B; a bit compressing circuit 3B; a fast fourier transfer (FFT) circuit 4B; a psychoacoustic modelling circuit 5B; a dynamic bit allocation circuit 6B; a scale factor selection information storage circuit 7B; a scale factor extraction circuit 8B; a side information coding circuit 9B; and a bit stream generating circuit 10B.

In the configuration described above, audio signal AS is divided into subband signals of 32 bands at the subband analyzing filter 1B. A scale factor of each subband signal is calculated by the scale factor selection information storage circuit 7B and the scale factor extraction circuit 8B.

Audio signal AS is processed through the fast fourier transfer circuit 4B. Based on the transformed result, a masking characteristic is calculated by the psychoacoustic modelling circuit 5B. Based on the calculated result, bit allocation is determined for each subband signal by the dynamic bit allocation circuit 6B. Each subband signal is then quantized by the linear quantizer circuit 2B based on the bit allocation. The quantized subband signals are synthesized by the bit stream generating circuit 10 together with side information coded by the side information coding circuit 9B.

As described so far in detail, the embodiment allows the ES data transfer system from the compression and encoding section 311 (n) to the SCSI interface 32 to be divided into two systems: the data transfer system and the transfer control system for controlling the transfer process of the data transfer system. ES data is thus transferred through the dedicated bus (the data tranfer buses 38 (n), 39 and 40). As a result, limitations are reduced on transfer of compressed data and control data due to an increase in traffic on the CPU bus 42.

Real-time processing of ES data is thereby achieved. It is possible that a capacity of the output buffer 312 (n) is reduced as well. Real-time processing of ES data allows the invention to be applied to an apparatus for generating compressed data of a multimedia system requiring real-time processing.

The embodiment of the invention provides the input buffer 33 in the input stage of the SCSI interface 32 for provisionally storing ES data inputted to the SCSI interface 32. The input buffer 33 absorbs difference in operating speed between the stream interface 34 and the SCSI interface 32.

The embodiment adopts the two-bank memory for the input buffer 33. As a result, difference in operating speed between the stream interface 34 and the SCSI interface 32 is easily absorbed although the communication medium such as a storage medium (the DSM 50) operates at a slow rate.

Furthermore, the configuration of the embodiment facilitates management of the input buffer 33 compared to a FIFO memory used for the input buffer 33.

Figure 8:
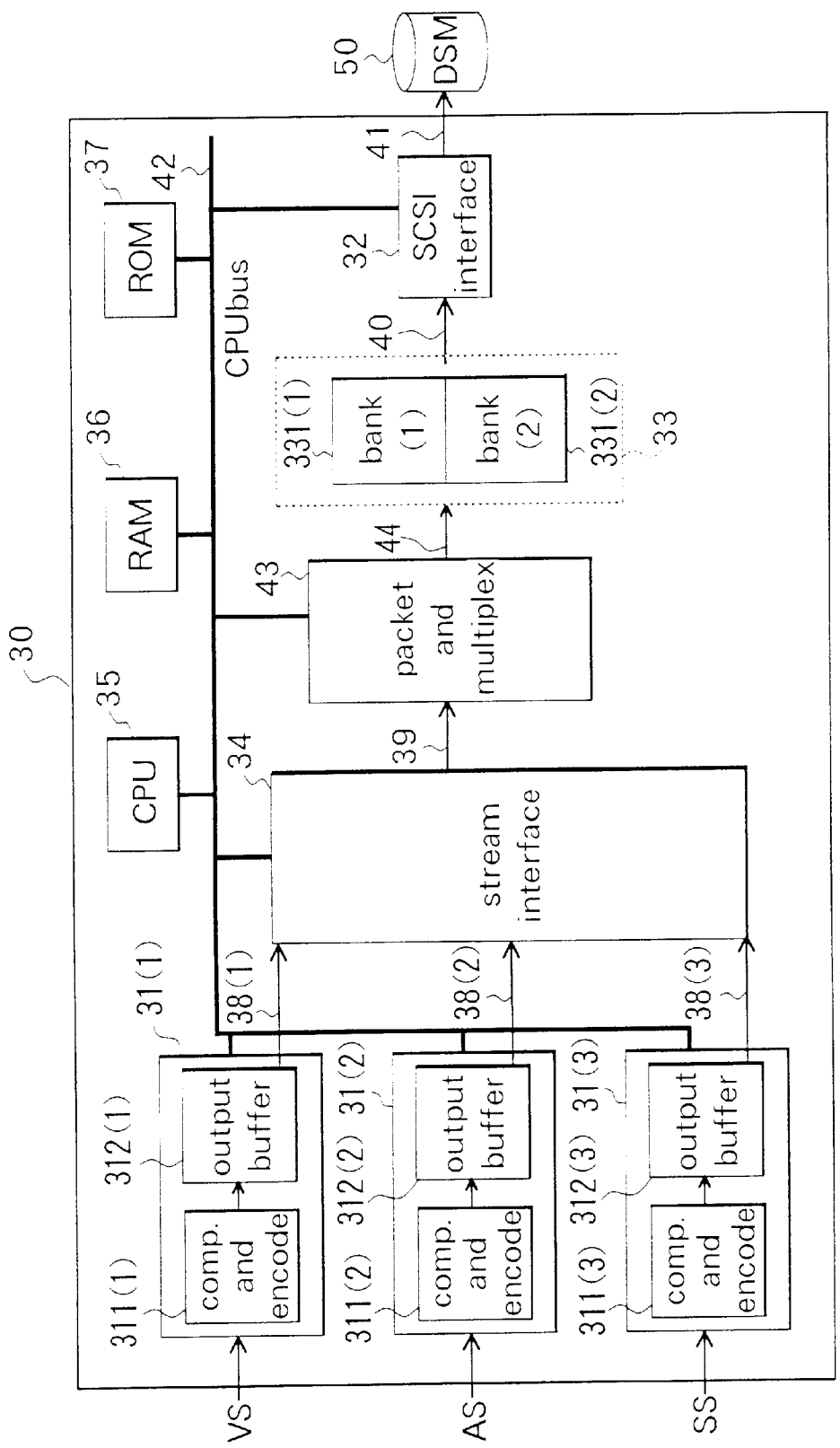
FIG. 8 is a block diagram of an apparatus for generating compressed data of a second embodiment of the invention.

A second embodiment of the invention will now be described. FIG. 8 is a schematic diagram showing a configuration of the embodiment. The same numerals are assigned to components having functions similar to those shown in FIG. 1 and detailed descriptions thereof are omitted.

In the foregoing first embodiment, ES data obtained through a compression and encoding process is supplied to the DSM 50 as it is. In the second embodiment, in contrast, ES data obtained through a compression and encoding process is transformed into program stream data (referred to as 'PS data' in the following description) of MPEG. PS data in the embodiment is ES data to which information required for synchronizing and multiplexing video, audio and subtitle signals separately compressed and encoded is added.

The second embodiment thus provides a packeting and multiplexing section 43 inserted between the stream interface 34 and the input buffer 33 as shown in FIG. 8. The packeting and multiplexing section 43 generates PS data through packeting and synchronized multiplexing of input data. The packeting and multiplexing section 43 corresponds to a multiplexing means of the invention.

Figure 9:
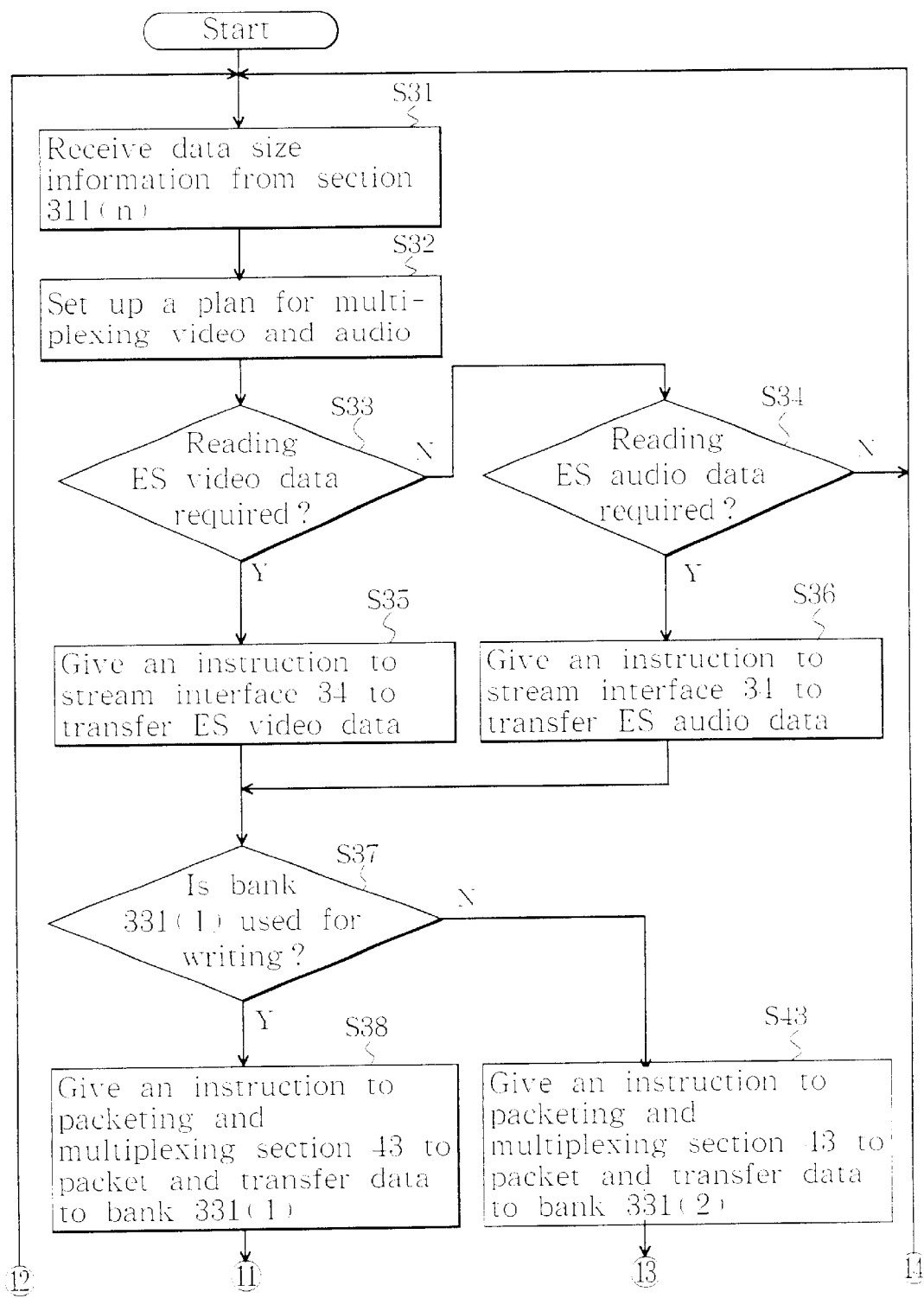
FIG. 9 is a flowchart showing a process performed by a CPU of the second embodiment.
Figure 10:
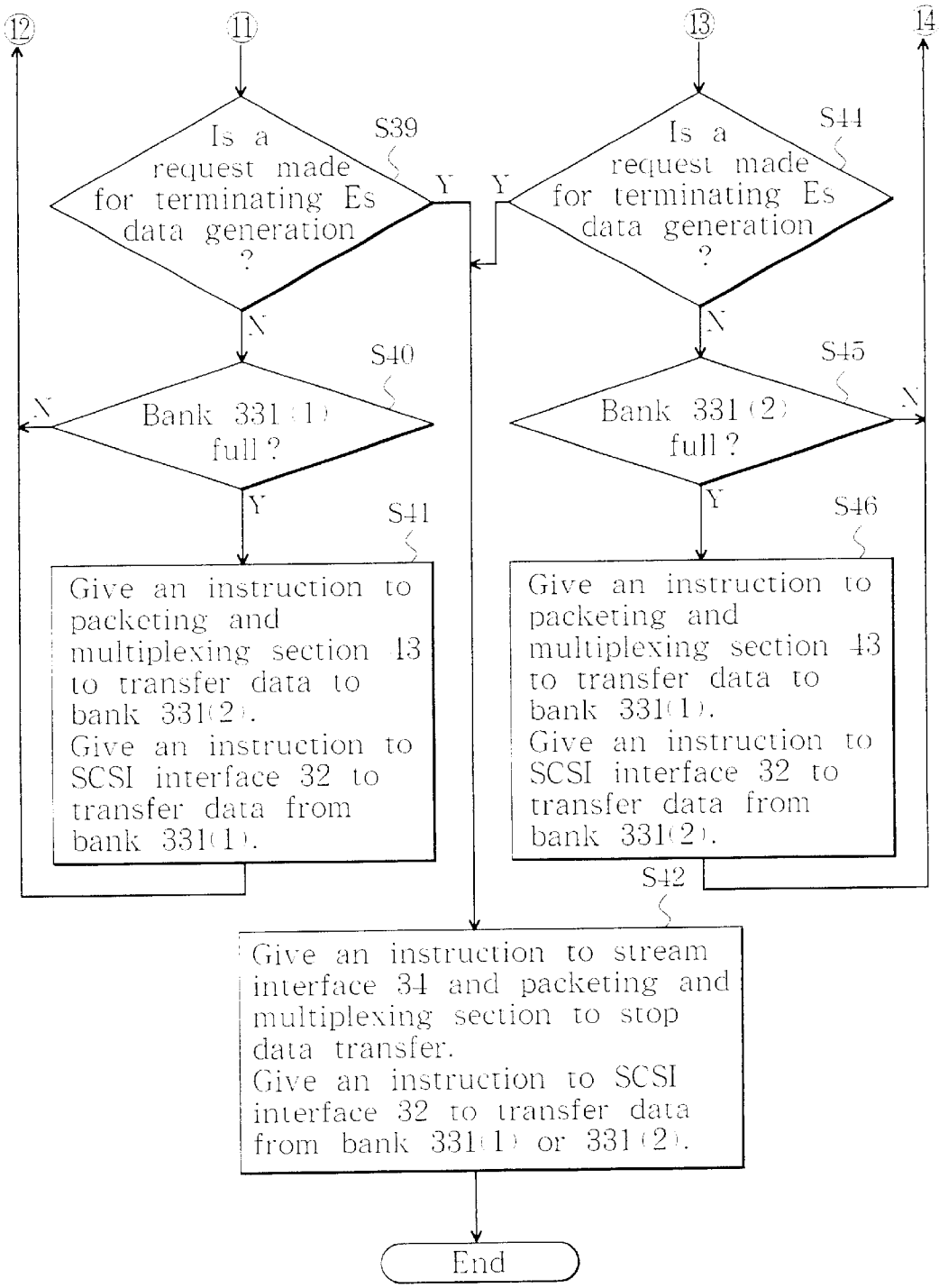
FIG. 10 is a flowchart showing the process performed by the CPU of the second embodiment.

FIG. 9 and FIG. 10 are flowcharts showing a process of the CPU 35 of the second embodiment. An operation of the embodiment will now be described with reference to FIG. 9 and FIG. 10. For brevity, synchronized multiplexing of a video and an audio will be only described.

In the process flow shown in FIG. 9 and FIG. 10, the CPU 35 first performs a process for receiving data size information outputted from the compression and encoding section 311 (n) (except the compression and encoding section 311 (3) in this example) (step S31 in FIG. 9). Then, the CPU 35 sets up a plan for multiplexing the video and audio based on the received data size information (step S32 in FIG. 9). The plan for multiplexing means a plan for how to multiplex the separately encoded video and audio signals. For example, in which order the packeted video and audio signals are multiplexed at the packeting and multiplexing section 43 is planned. The CPU 35 then determines whether it is required to read ES data from the output buffer 312 (1) of the video or not, based on the plan for multiplexing (step S33 in FIG. 9).

If reading ES video data is not required, the CPU 35 determines whether it is required to read ES data from the output buffer 312 (2) of the audio or not. If reading ES audio data is not required, the CPU 35 returns to step S31. The process described above is thus repeated.

If reading ES video data is required, the CPU 35 gives an instruction to the stream interface 34 to transfer ES video data (step S35 in FIG. 9). On receiving the instruction, the stream interface 34 reads ES data from the output buffer 312 (1) of the video and supplies the data to the packeting and multiplexing section 43 through the data transfer bus 39.

Similarly, if reading ES audio data is required, the CPU 35 gives an instruction to the stream interface 34 to transfer ES audio data (step S36 in FIG. 9). On receiving the instruction, the stream interface 34 reads ES data from the output buffer 312 (2) of the audio and supplies the data to the packeting and multiplexing section 43 through the data transfer bus 39.

On completion of the instruction of step S35 or S36, the CPU 35 determines whether the bank used for writing is the bank 331 (1) or not (step S37 in FIG. 9). If the bank 331 (1) is used, the CPU 35 gives an instruction to the packeting and multiplexing section 43 to transfer data to the bank 331 (1) (step S38 in FIG. 9). On receiving the instruction, the packeting and multiplexing section 43 packets the inputted data and writes the packeted data into the bank 331 (1) through the data transfer bus 44. The packeting and multiplexing section 43 adds time information for synchronized replay as well.

On completion of the instruction of step S38, the CPU 35 determines whether a request for terminating the ES data (PS data) generation process is made or not (step S39 in FIG. 10). If a request for termination is not made, the CPU 35 determines whether the bank 331 (1) is full or not (step S40 in FIG. 10). If the bank 331 (1) is not full, the CPU 35 returns to step S31. The process described above is thus repeated.

If the bank 331 (1) is full, the CPU 35 gives an instruction to the packeting and multiplexing section 43 to transfer data to the bank 331 (2) as well as an instruction to the SCSI interface 32 to transfer data from the bank 331 (1) (step S41 in FIG. 10).

On receiving the instruction, the packeting and multiplexing section 43 writes the generated PS data into the bank 331 (2). On receiving the instruction, the SCSI interface 32 reads the PS data written into the bank 331 (2) and writes the data into the DSM 50.

On completion of the instruction, the CPU 35 returns to step S31. The process described above is thus repeated.

If a request for terminating the ES data generating process is made in this stage, the CPU 35 gives an instruction to the stream interface 34 and the packeting and multiplexing section 43 to stop the data transfer. On termination of transfer of ES data from the bank 331 (1), the CPU 35 gives an instruction to the SCSI interface 32 to transfer data from the bank 331 (2) (step S42 in FIG. 10).

On receiving the instruction, the stream interface 34 and the packeting and multiplexing section 43 terminate the data transfer. On receiving the instruction, the SCSI interface 32 transfers PS data stored in the bank 331 (2) to the DSM 50. The process of the CPU 35 is thus completed.

If it is determined that the bank 331 (1) is not used in step S37, the CPU 35 gives an instruction to the packeting and multiplexing section 43 to packet data and transfer the data to the bank 331 (2) (step S43 in FIG. 9). On receiving the instruction, the packeting and multiplexing section 43 packets the inputted data and writes the packeted data into the bank 331 (2) through the data transfer bus 44.

On completion of the instruction of step S43, the CPU 35 determines whether a request for terminating the ES data (PS data) generation process is made or not (step S44 in FIG. 10). If a request for termination is not made, the CPU 35 determines whether the bank 331 (2) is full or not (step S45 in FIG. 10). If the bank 331 (2) is not full, the CPU 35 returns to step S31.

If the bank.331 (1) is full, the CPU 35 gives an instruction to the packeting and multiplexing section 43 to transfer data to the bank 331 (2) as well as an instruction to the SCSI interface 32 to transfer data from the bank 331 (1) (step S46 in FIG. 10).

On receiving the instruction, the packeting and multiplexing section 43 writes the generated PS data into the bank 331 (2). On receiving the instruction, the SCSI interface 32 reads the PS data from the bank 331 (2) and writes the data into the DSM 50.

On completion of the instruction of step S46, the CPU 35 returns to step S31. The process described above is thus repeated. If a request for terminating the ES data generating process is made in this stage, the CPU 35 gives an instruction to the stream interface 34 and the packeting and multiplexing section 43 to stop the data transfer. On termination of data transfer from the bank 331 (2), the CPU 35 gives an instruction to the SCSI interface 32 to transfer data from the bank 331 (1) (step S42 in FIG. 10).

On receiving the instruction, the stream interface 34 and the packeting and multiplexing section 43 terminate the data transfer. On receiving the instruction, the SCSI interface 32 transfers PS data stored in the bank 331 (1) to the DSM 50. The process of the CPU 35 is thus completed.

The second embodiment described so far achieves effects similar to those of the first embodiment.

Figure 11:
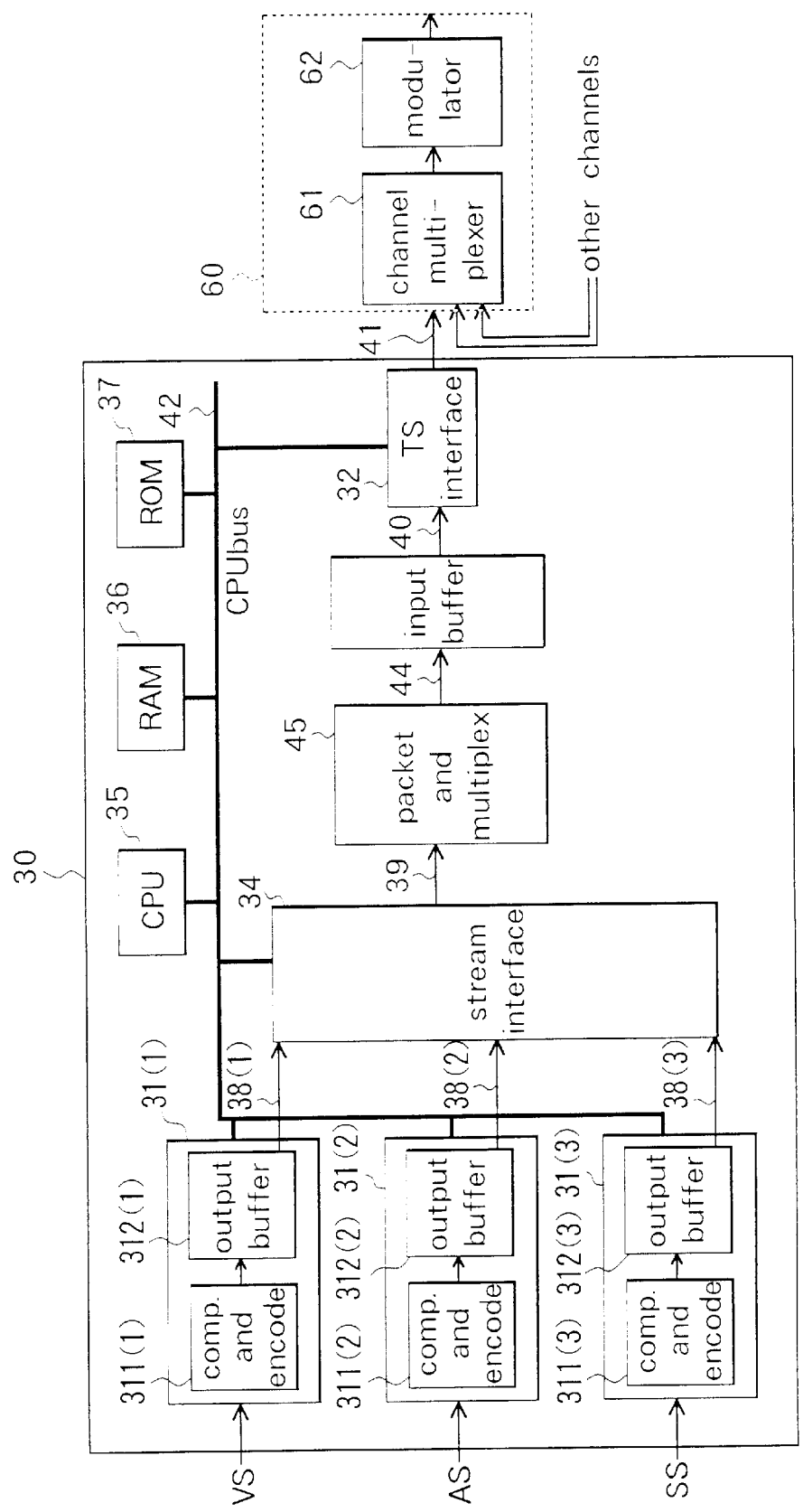
FIG. 11 is a block diagram of an apparatus for generating compressed data of a third embodiment of the invention.
Figure 12:
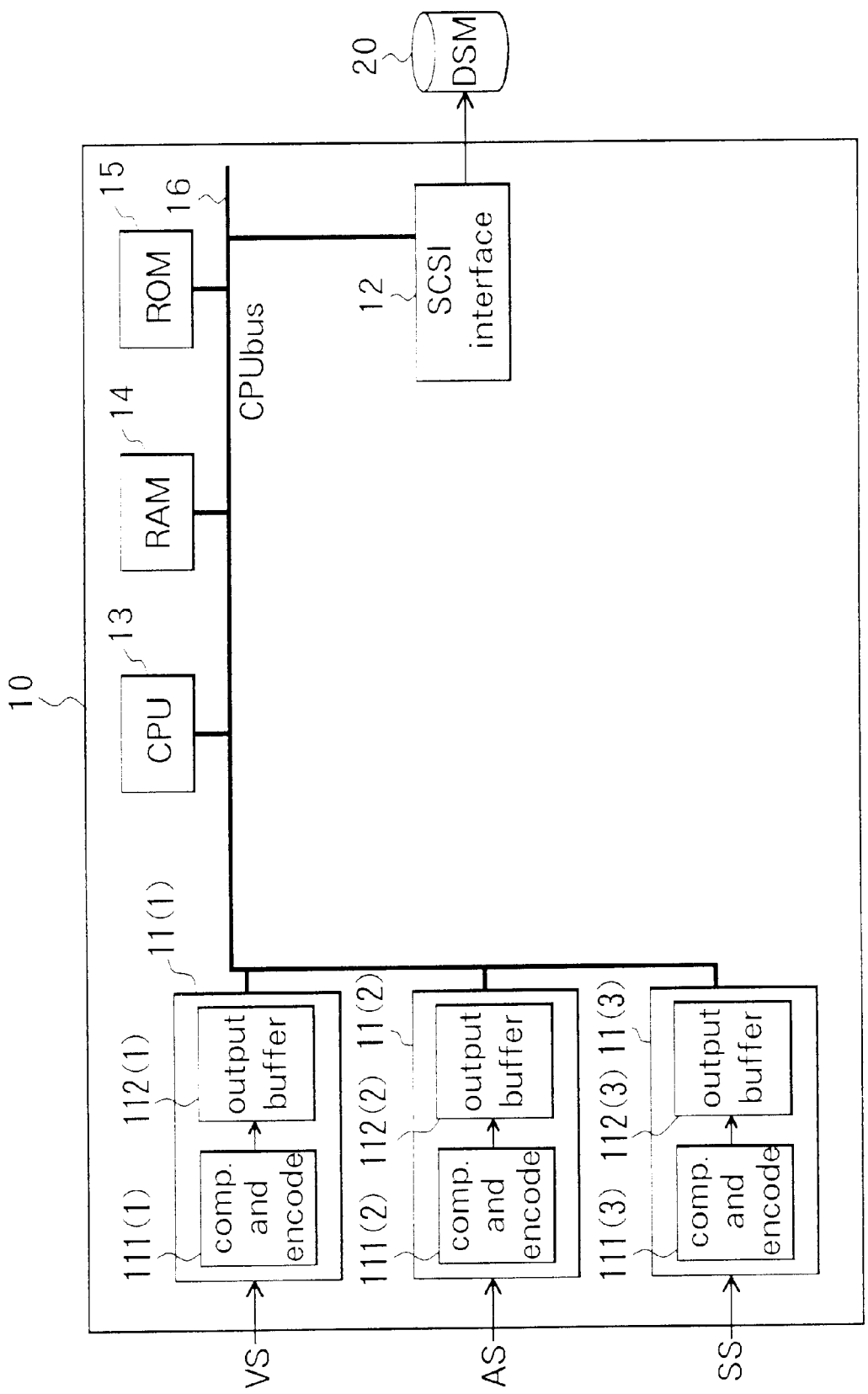
FIG. 12 is a block diagram of an apparatus for generating compressed data of a related art.

A third embodiment of the invention will now be described. FIG. 11 is a block diagram showing a configuration of the embodiment. The same numerals are assigned to components having functions similar to those shown in FIG. 1 and detailed descriptions thereof are omitted.

In the foregoing first and second embodiments, ES data (including data transformed into PS data) is outputted to the storage medium. In the third embodiment, in contrast, ES data is transformed into transport stream data (referred to as 'TS data' in the following description) of MPEG2 to be outputted to a broadcast medium. TS data in the embodiment means ES data to which information is added so that the data may be outputted to a broadcast medium or a telecommunications medium.

The third embodiment thus provides a packeting and multiplexing section 45, an input buffer 46 and a transport stream (TS) interface 47 in the output stage of the stream interface 34 as shown in FIG. 11.

The packeting and multiplexing section 45 generates TS data for a broadcast medium and a telecommunications medium through packeting ES data outputted from the stream interface 34 and through synchronized multiplexing of packeted data.

The input buffer 46 is provided for provisionally storing TS data supplied from the packeting and multiplexing section 45. FIFO memory may be used for the input buffer 46. The input buffer 46 is not necessarily implemented with two-bank memory since a broadcast medium is adopted as a communication medium in the embodiment. That is, an operating speed of a broadcast medium requiring real time is faster than other communication media.

The transport stream interface 47 has a function of outputting TS data stored in the input buffer 46 to a broadcast medium 60. FIG. 11 shows a channel multiplexer 61 and a modulator 62 among components of the broadcast medium 60. The channel multiplexer 61 has a function of multiplexing TS data of a plurality of channels. The modulator 62 has a function of modulating multiplexed output into signals of a radio band, for example.

The third embodiment described so far achieves effects similar to those of the first and second embodiments.

The present invention is not limited to the three embodiments described so far in detail.

The foregoing embodiments provides the apparatus for generating compressed data of video signal VS, audio signal AS and subtitle signal SS of one program as compressed data of a plurality of temporally relating material signals. Alternatively, the invention may be applied to an apparatus for generating compressed data of any other material signals.

Instead of a plurality of material signals as in the foregoing embodiments, the invention may be applied to an apparatus for generating compressed data of a single material signal.

It is obvious that the invention may be practiced in still other ways.

According to the invention described so far in detail, limitations are reduced on transfer of compressed data and control data due to an increase in traffic on the general-purpose bus.

Real-time processing of compressed data is therefore achieved. It is possible that a capacity of the first accumulation means is reduced. Real-time processing of compressed data allows the invention to be applied to an apparatus for generating compressed data of a multimedia system requiring realtime processing.

The apparatus for generating compressed data of the invention may further comprise the accumulation means in the input stage of the means for data output for provisionally storing compressed data to be inputted to the data output means. The accumulation means thus absorbs difference in operating speed between the data transfer means and the data output means.

The apparatus for generating compressed data of the invention may include two-bank memory for the accumulation means in the input stage of the data output means. As a result, difference in operating speed between the data transfer means and the data output means is easily absorbed although the communication medium such as a storage medium operates at a slow rate.

Furthermore, the configuration facilitates management of the accumulation means compared to FIFO memory used for the accumulation means. Industrial Applicability The apparatus and method of generating compressed data of the invention thus described are capable of reducing limitations on transfer of compressed data and control data due to an increase in traffic. The apparatus and method are therefore ideal for implementing a multimedia system, for example.

What is claimed is:

1. An apparatus for generating compressed data comprising:
compression and encoding means for compressing and encoding input data;
output means for outputting the compressed data from the compression and encoding means;
data transfer means for transferring the compressed data from the compression and encoding means to the output means, the data transfer means including:
first accumulation means for provisionally storing the compressed data from the compression and encoding means;
second accumulation means for provisionally storing the compressed data from the first accumulation means, the second accumulation means including a plurality of storage means, each of the storage means including at least an input buffer and an output buffer each of said respective output buffers being enabled if the corresponding storage means becomes full; and a data interface for transferring the compressed data from the first accumulation means to the second accumulation means; and control means connected to the compression and encoding means through a control bus for controlling a data transfer of the compressed data from the compression and encoding means to the data transfer means based on control information from the control bus.

2. An apparatus for generating compressed data according to claim 1, wherein the compression and encoding means outputs the control information indicating a state of accumulation of the first accumulation means to the control means through the control bus, and the control means control for outputting controls the data interface for transferring the compressed data stored in the first accumulation means to the second accumulation means based on the control information.

3. An apparatus for generating compressed data according to claim 1, wherein the control means controls the data interface based on the control information so that the compressed data outputted from the first accumulation means is inputted to the data interface.

4. An apparatus for generating compressed data according to claim 1, wherein the control means performs control, based on the control information, for transferring the compressed data stored in the first accumulation means to a first storage means of the plurality of storage means and having a second storage means of the plurality of storage means store the compressed data by switching from the first storage means to the second storage means when storage of the compressed data in the first storage means is disabled.

5. An apparatus for generating compressed data according to claim 4, wherein:

the control means performs control for having the second storage means store the compressed data by switching from the first storage means to the second storage means when storage of the compressed data in the first storage means is disabled and for transferring the compressed data stored in the first storage means to the output means.

6. An apparatus for generating compressed data according to claim 5, wherein the compressed data stored in the first storage means is transferred to the output means by enabling the respective output buffer of the first storage means.

7. An apparatus for generating compressed data according to claim 4, wherein the compressed data stored in the first accumulation means is transferred to the first storage means by enabling the respective input buffer of the first storage means.

8. An apparatus for generating compressed data according to claim 4, wherein the switching includes enabling the respective input buffer of the second storage means.

9. An apparatus for generating compressed data according to claim 1, wherein the output means transforms the compressed data transferred from the data transfer means to be produced as data outputted to outside the apparatus.

10. An apparatus for generating compressed data according to claim 1, wherein the compression and encoding means is made up of at least a video compression and encoding means for compressing and encoding video data and an audio compression and encoding means for compressing and encoding audio data; and the data transfer means includes a multiplexing means for multiplexing compressed video data outputted from the video compression and encoding means and compressed audio data outputted from the audio compression and encoding means and transferring the multiplexed data to the output means.

11. An apparatus for generating compressed data according to claim 7, wherein the control means sets up a plan for multiplexing performed by the multiplexing means based on the control information outputted from the compression and encoding means and inputted through the control bus; and the multiplexing means multiplexes the compressed video data and the compressed audio data and transfers the multiplexed data to the output means based on the plan.

12. A method of generating compressed data, comprising the steps of:

compressing and encoding input data;

receiving control information on the compressed data through a control bus;

transferring the compressed data based on the control information, including the steps of:

provisionally accumulating the compressed data in a first accumulation means;

transferring the compressed data accumulated in the first accumulation means to a second accumulation means, the second accumulation means including a plurality of storage means, each of the storage means including at least an input buffer and an output buffer, each of said respective output buffers being enabled if the corresponding storage means becomes full; and provisionally accumulating the compressed data transferred from the first accumulation means in the second accumulation means; and outputting the compressed data.

13. A method of generating compressed data according to claim 12, wherein the control information indicating a state of accumulation of the compressed data accumulated in the first accumulation means is outputted through the control bus in the step of compressing and encoding, and the step of transferring the compressed data accumulated in the first accumulation means to a second accumulation means is controlled based on the outputted control information.

14. A method of generating compressed data according to claim 12, wherein the step of transferring the compressed data accumulated in the first accumulation means to a second accumulation means is controlled based on the control information, for storing the compressed data accumulated in the first accumulation means in a first storage means of the plurality of storage means in the second accumulation step and having a second storage means of the plurality of storage means store the compressed data by switching from the first storage means to the second storage means in the second accumulation step when storage of the compressed data in the first storage means is disabled.

15. A method of generating compressed data according to claim 14, wherein the step of transferring the compressed data accumulated in the first accumulation means to a second accumulation means is controlled for having the second storage means store the compressed data by switching from the first storage means to the second storage means when storage of the compressed data in the first storage means is disabled in the second accumulation step and for transferring the compressed data stored in the first storage means to be outputted in the step of outputting.

16. A method of generating compressed data according to claim 15, wherein the compressed data stored in the first storage means is outputted by enabling the respective output buffer of the first storage means.

17. A method of generating compressed data according to claim 14, wherein the compressed data accumulated in the first accumulation means is stored in the first storage means by enabling the respective input buffer of the first storage means.

18. A method of generating compressed data according to claim 14, wherein the switching includes enabling the respective input buffer of the second storage means.

19. A method of generating compressed data according to claim 12, wherein the step of compressing and encoding includes at least a video compression and encoding step of compressing and encoding input video data and an audio compression and encoding step of compressing and encoding input audio data; and the step of transferring the compressed data based on the control information includes a multiplexing step for multiplexing compressed video data compressed and encoded in the video compression and encoding step and compressed audio data compressed and encoded in the audio compression and encoding step.

20. A method of generating compressed data according to claim 19, wherein a plan for multiplexing in the multiplexing step is made based on the control information received through the control bus, and the compressed video data and the compressed audio data are multiplexed in the multiplexing step based on the plan.

* * * * *